(12) United States Patent
Jin et al.

(10) Patent No.: US 12,452,644 B2
(45) Date of Patent: Oct. 21, 2025

(54) DELETED eSIM RECOVERY

(71) Applicant: Apple Inc., Cupertino, CA (US)

(72) Inventors: Sherman X. Jin, Santa Clara, CA (US);
Rohan C. Malthankar, San Jose, CA (US); Rafael L. Rivera-Barreto, Santa Clara, CA (US); Clive E. Rodgers, Palo Alto, CA (US); Raj S. Chaugule, Santa Clara, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 630 days.

(21) Appl. No.: 17/932,667

(22) Filed: Sep. 15, 2022

(65) Prior Publication Data

US 2023/0083018 A1   Mar. 16, 2023

Related U.S. Application Data

(60) Provisional application No. 63/261,292, filed on Sep. 16, 2021.

(51) Int. Cl.
*H04W 8/20* (2009.01)

(52) U.S. Cl.
CPC .................................. *H04W 8/205* (2013.01)

(58) Field of Classification Search
CPC .............................. H04W 8/205; H04W 8/183
See application file for complete search history.

(56) References Cited

U.S. PATENT DOCUMENTS

| 11,974,203 | B2* | 4/2024 | Challa | H04W 4/50 |
| 2002/0089543 | A1* | 7/2002 | Ostergaard | H04M 1/2747 |
| | | | | 715/764 |
| 2018/0352432 | A1* | 12/2018 | Barki | H04W 12/35 |
| 2022/0070655 | A1* | 3/2022 | Lim | H04L 67/306 |
| 2024/0106818 | A1* | 3/2024 | Nimbavikar | H04L 63/0861 |

* cited by examiner

*Primary Examiner* — Barry W Taylor
(74) *Attorney, Agent, or Firm* — DICKINSON WRIGHT RLLP

(57) ABSTRACT

The described embodiments set forth techniques for recovering one or more electronic subscriber identity modules (eSIMs) previously deleted from an embedded universal integrated circuit card (eUICC) of a mobile wireless device. Prior to deletion of an eSIM, the mobile wireless device uploads first eSIM subscription information to a cloud network services server and stores second eSIM subscription information in a secure memory of the eUICC. The mobile wireless device can subsequently download the first eSIM subscription information to verify matching to the second eSIM subscription information stored in the eUICC before displaying an option for recovering the eSIM. The mobile wireless device sends to a mobile network operator (MNO) provisioning server an eSIM recovery request notification that includes at least a portion of the first eSIM subscription information, and the MNO provisioning server provides an eSIM recovery response message indicating approval and a network address to download the eSIM.

20 Claims, 12 Drawing Sheets

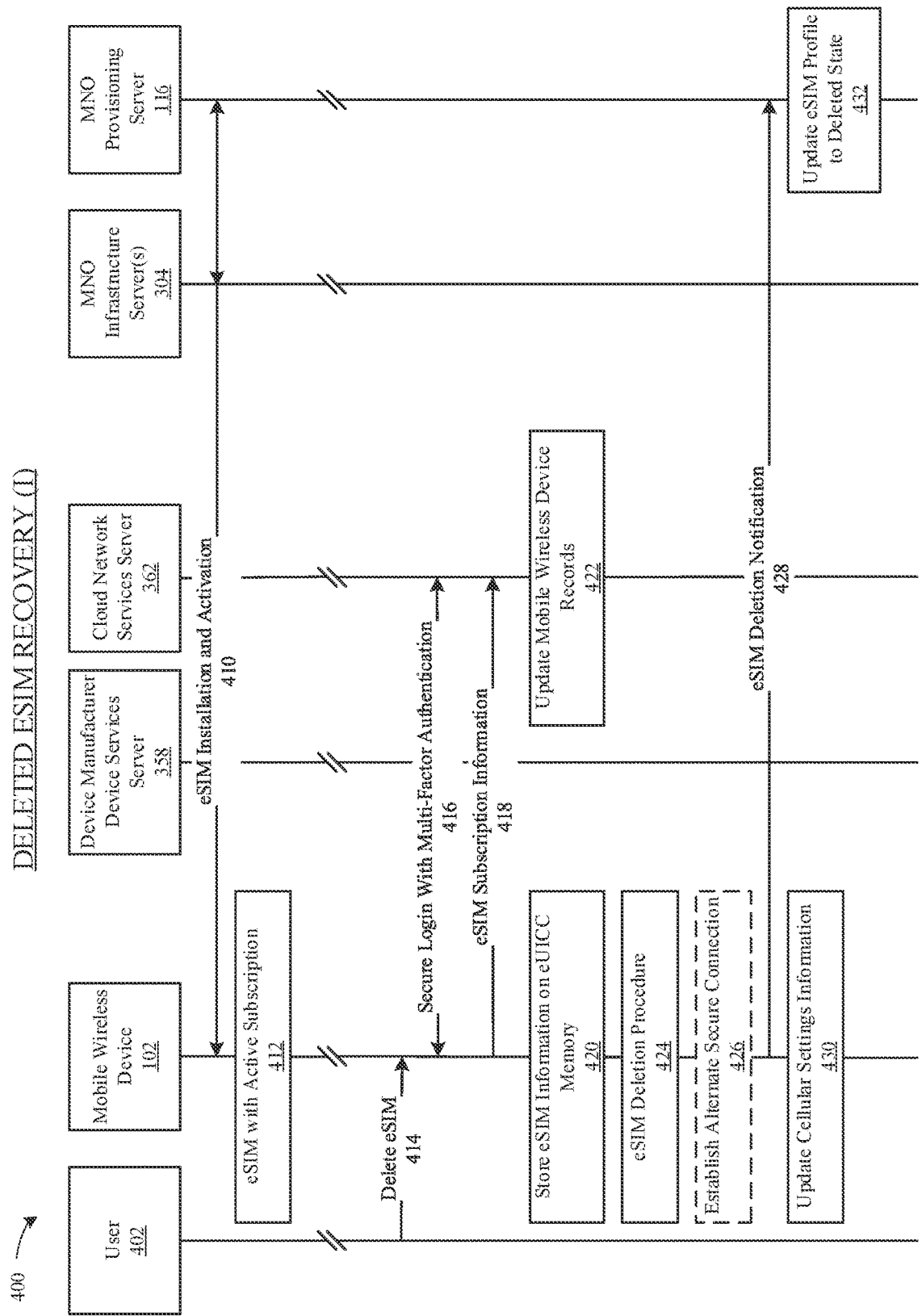

DELETED eSIM RECOVERY

CROSS-REFERENCE TO RELATED APPLICATIONS

The present application claims the benefit of U.S. Provisional Application No. 63/261,292, entitled "DELETED eSIM RECOVERY," filed Sep. 16, 2021, the content of which is incorporated by reference herein in its entirety for all purposes.

FIELD

The described embodiments set forth techniques for recovering an electronic subscriber identity module (eSIM) after deletion of the eSIM from an embedded Universal Integrated Circuit Card (eUICC) of a mobile wireless device. Subscription information for the eSIM is uploaded to a cloud network services server, and eSIM information is also stored in secure memory of the eUICC before deletion. Recovery of the eSIM requires secure user authentication with the cloud network services server, cross verification of eSIM information at the mobile wireless device, and approval by a Mobile Network Operator (MNO) provisioning server.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as a subscriber identity module (SIM). Typically, a UICC takes the form of a small removable card, commonly referred to as a SIM card or physical SIM (pSIM) card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Disablement of a physical SIM can be performed by an associated MNO, such as when a user cancels a cellular wireless service subscription. A user of the mobile wireless device, however, can be unable to alter the pSIM directly. Re-establishment of a cellular wireless service subscription can require obtaining a new pSIM and/or visiting an MNO retail sales outlet. An eSIM on an eUICC, can be deleted by a user purposefully, such as when changing cellular service, or inadvertently, such as when erasing the device to perform a factory restoration process. Recovery of one or more deleted eSIMs can require direct interaction with each associated MNO, such as via a voice or data connection; however, the mobile wireless device can be without cellular connectivity due to deletion of the eSIM. Moreover, recovery of an eSIM for an erased mobile wireless device can require proper user authentication. There exists a need for secure and efficient eSIM recovery mechanisms.

SUMMARY

The described embodiments set forth techniques for recovering an electronic subscriber identity module (eSIM) after deletion of the eSIM from an embedded Universal Integrated Circuit Card (eUICC) of a mobile wireless device. Recovery of the eSIM to the mobile wireless device can require that the mobile wireless device be registered by a user with a device manufacturer cloud network service, such as Apple's iCloud® service. In addition, the user shall have enabled multi-factor authentication for the mobile wireless device before deletion of the eSIM occurs. Subscription information for the eSIM, including an integrated circuit card identifier (ICCID) value for the eSIM, a network address (e.g., universal resource locator, URL, or fully qualified domain name, FQDN) for an MNO provisioning server associated with the eSIM, and a unique eUICC identifier (EID) value for the eUICC on which the eSIM resides, is uploaded to a cloud network services server. Additionally, at least a portion of the eSIM subscription information, e.g., the eSIM ICCID value and the MNO provisioning server's network address, is also stored in a secure memory of the eUICC before eSIM deletion. The mobile wireless device provides notification of successful deletion of the eSIM to the MNO provisioning server, which updates status of the eSIM profile to a deleted state. Recovery of the eSIM at a subsequent time can require secure user authentication of the user, e.g., by logging into the cloud network services server and providing multi-factor authentication. The mobile wireless device downloads the previously stored eSIM subscription information from the cloud network services server and cross verifies the downloaded eSIM subscription information with previously stored eSIM information obtained from the eUICC. With the eSIM subscription information verified, an option for eSIM recovery can be presented to a user of the mobile wireless device, e.g., in a settings application interface. Responsive to a request for recovery of the eSIM, the mobile wireless device sends a notification to the MNO provisioning server requesting eSIM recovery. The notification can include one or more required eSIM recovery parameters, such as the ICCID value of the eSIM, the EID value of the eUICC of the mobile wireless device, cryptographic keys, and/or a digital certificate for secure authentication and/or verification. With proper authorization to recover the eSIM confirmed based at least in part on the supplied eSIM recovery parameters, the MNO provisioning server updates a status of the eSIM profile from the deleted state to a released state and sends an acknowledgement notification of the status update to the mobile wireless device. In some embodiments, the acknowledgement notification includes a network address for an MNO provisioning server from which to download the eSIM. In some embodiments, the acknowledgement notification includes a network address for a device manufacturer device services server to provide eSIM provisioning information to the mobile wireless device. The eSIM can be subsequently downloaded from the MNO provisioning server and installed on the eUICC of the mobile wireless device. After successful installation, the mobile wireless device notifies the MNO provisioning server, which updates the status of the eSIM profile from the released state to an installed state. After camping on a cellular access network using the credentials of the eSIM, the mobile wireless device can receive an over-the-air (OTA) update of the eSIM profile from an MNO infrastructure server.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 4A, 4B, and 4C illustrate an exemplary message exchange for recovery of a deleted eSIM by a mobile wireless device with cloud network service assistance, according to some embodiments.

DETAILED DESCRIPTION

Figure 1:
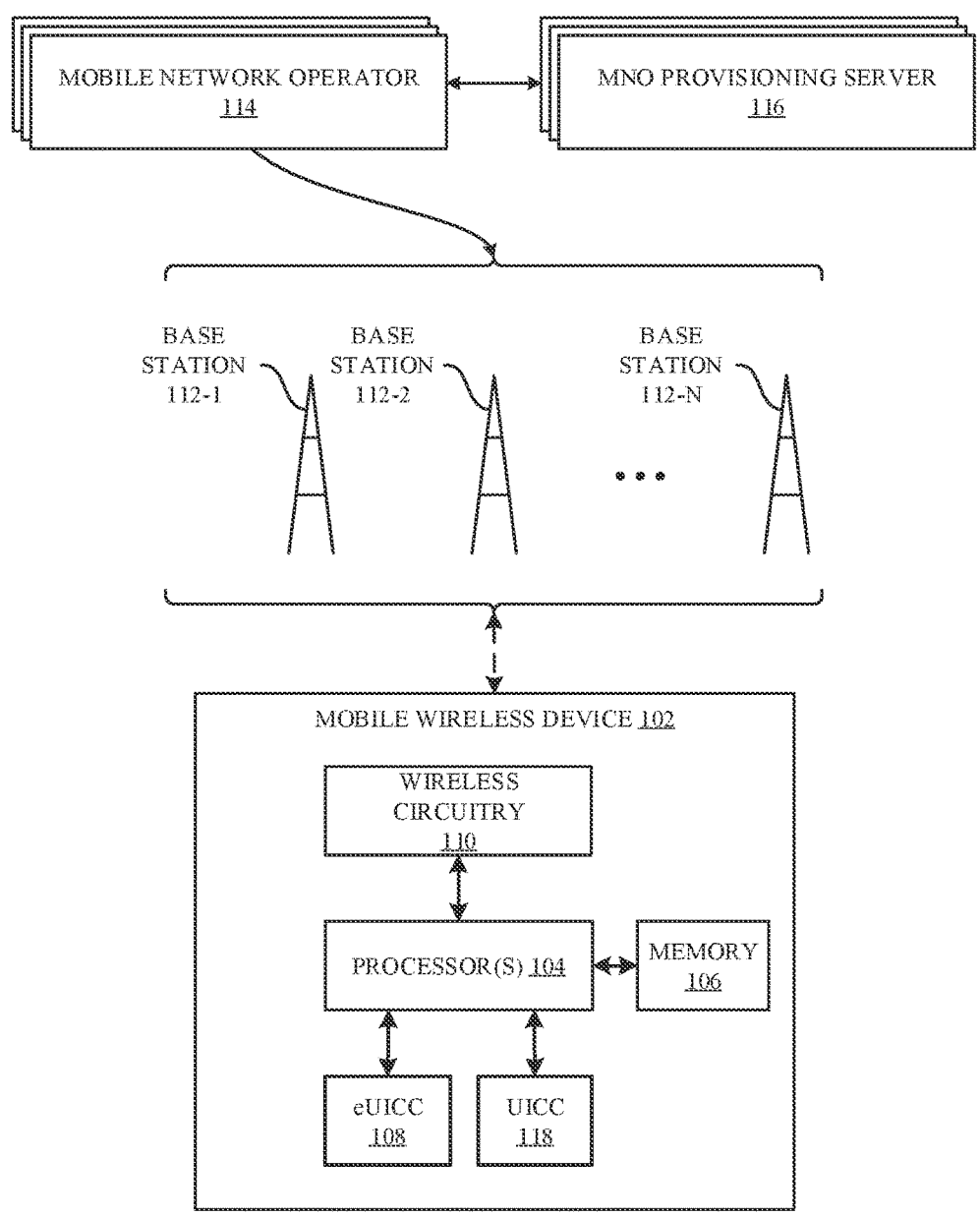
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments set forth techniques for recovering an electronic subscriber identity module (eSIM) after deletion of the eSIM from an embedded Universal Integrated Circuit Card (eUICC) of a mobile wireless device. Deletion of an eSIM can occur as a result of a user command to delete the eSIM, such as when changing or discontinuing cellular wireless service for the mobile wireless device. In some scenarios, a user can delete an eSIM inadvertently via a settings command of the mobile wireless device. Deletion of the eSIM can also occur as a side effect of performing a factory reset or erase all contents and settings procedure for the mobile wireless device. A user of the mobile wireless device may later choose to reinstate the previously delete eSIM or restore the mobile wireless device and seek to reinstall one or more previously deleted eSIMs.

To ensure that only an authorized user of the mobile wireless device can re-download a previously deleted eSIM to the eUICC of the mobile wireless device, recovery of the eSIM can require that the mobile wireless device be registered by, and therefore associated with a user account of, a user with a device manufacturer cloud network service, such as Apple's iCloud® service. The cloud network service can provide secure, encrypted storage of information regarding eSIMs and cellular wireless service subscriptions of the mobile wireless device. In addition, the user shall have enabled multi-factor authentication for the mobile wireless device before deletion of the eSIM occurs as an additional check. Cellular wireless service subscription information for one or more eSIMs associated with one or more MNOs can be encrypted and uploaded to a cloud network service's server for subsequent retrieval. Exemplary subscription information for an eSIM can include an integrated circuit card identifier (ICCID) value for the eSIM, a network address (e.g., universal resource locator, URL, or fully qualified domain name, FQDN) for an MNO provisioning server associated with the eSIM, and a unique eUICC identifier (EID) value for the eUICC on which the eSIM resides. Additionally, at least a portion of the eSIM subscription information, e.g., the eSIM ICCID value and the MNO provisioning server's network address, is also stored in a secure memory of the eUICC before eSIM deletion. Both remote storage of the eSIM information at the cloud network service and local storage of the eSIM information on the eUICC memory of the mobile wireless device can occur before deleting the eSIM.

The mobile wireless device provides notification of successful deletion of the eSIM to the associated MNO provisioning server, which updates a status of the eSIM profile maintained by the MNO provisioning server from an installed state to a deleted state. Recovery of the eSIM at a subsequent time can require secure user authentication of the user, e.g., by logging into the cloud network services server to the particular user account to which the previously uploaded eSIM information was stored and providing multi-factor authentication. Without an active login to the same user account or when logging into a separate user account, recovery of the previously deleted eSIM will not be allowed.

The mobile wireless device downloads the previously stored eSIM subscription information from the cloud network services server and cross verifies the downloaded eSIM subscription information with previously stored eSIM information obtained from the eUICC to determine whether the downloaded eSIM information matches the locally stored eSIM information. With the eSIM subscription information verified, an option for eSIM recovery can be presented to a user of the mobile wireless device, e.g., in a settings application interface. In some embodiments, multiple different eSIMs associated with one or more distinct MNOs can be able to be recovered.

Responsive to a request for recovery of a particular eSIM, the mobile wireless device sends a notification message to the MNO provisioning server associated with the particular eSIM requesting eSIM recovery. Communication between the mobile wireless device and the MNO provisioning server can occur via non-cellular wireless connection, e.g., a wireless local area network connection, or via a cellular wireless connection using a separate SIM profile, such as a different eSIM, a physical SIM, or a limited functionality bootstrap SIM when no other connection is feasible. The notification message sent to the MNO provisioning server can include one or more required eSIM recovery parameters, such as the ICCID value of the eSIM, the EID value of the eUICC of the mobile wireless device, one or more cryptographic keys, and/or digital certificates to use for secure authentication and/or verification. In some embodiments, the notification message requesting eSIM recovery is a device manufacturer proprietary application programming interface (API) command. In some embodiments, the notification message requesting eSIM recovery is communicated via a secure connection and protected by a GSMA public certificate. In some embodiments, verification of the notification message can include a block-chain type of encryption service.

With proper authorization to recover the eSIM confirmed based at least in part on the supplied eSIM recovery parameters, the MNO provisioning server updates the status of the eSIM profile maintained by the MNO provisioning server from the deleted state to a released state and sends an acknowledgement notification of the status update to the mobile wireless device. In some embodiments, the acknowledgement notification includes a network address for an MNO provisioning server from which to download the eSIM. In some embodiments, the acknowledgement notification includes a network address for a device manufacturer device services server to provide eSIM provisioning information to the mobile wireless device. The eSIM can be subsequently downloaded from the MNO provisioning server and installed on the eUICC of the mobile wireless device. After successful installation, the mobile wireless device notifies the MNO provisioning server, which updates the status of the eSIM profile from the released state to an installed state. After camping on a cellular access network using the credentials of the eSIM, the mobile wireless device can receive an over-the-air (OTA) update of the eSIM profile from an MNO infrastructure server.

These and other embodiments are discussed below with reference to FIGS. 1-7; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of MNO provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMs (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated MNO provisioning servers 116. The MNO provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

Figure 2:
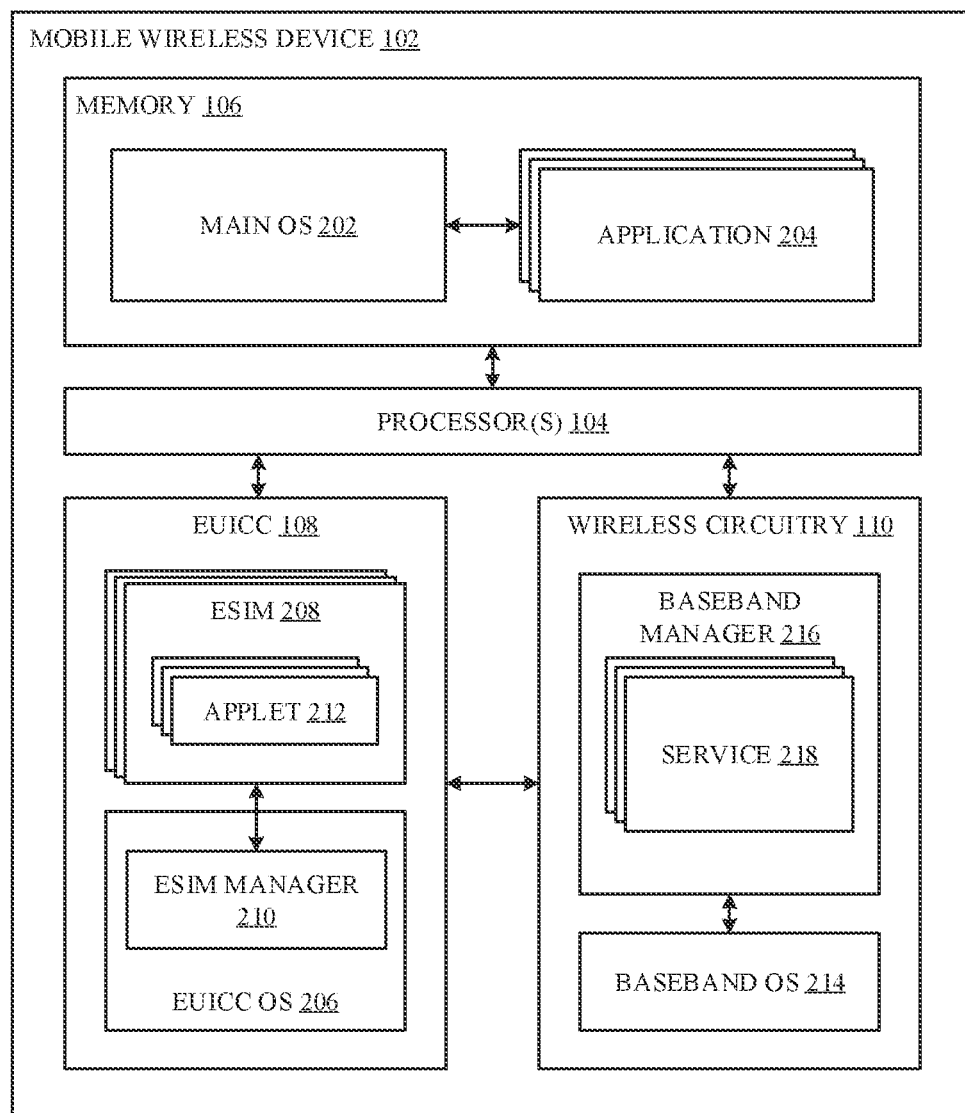
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
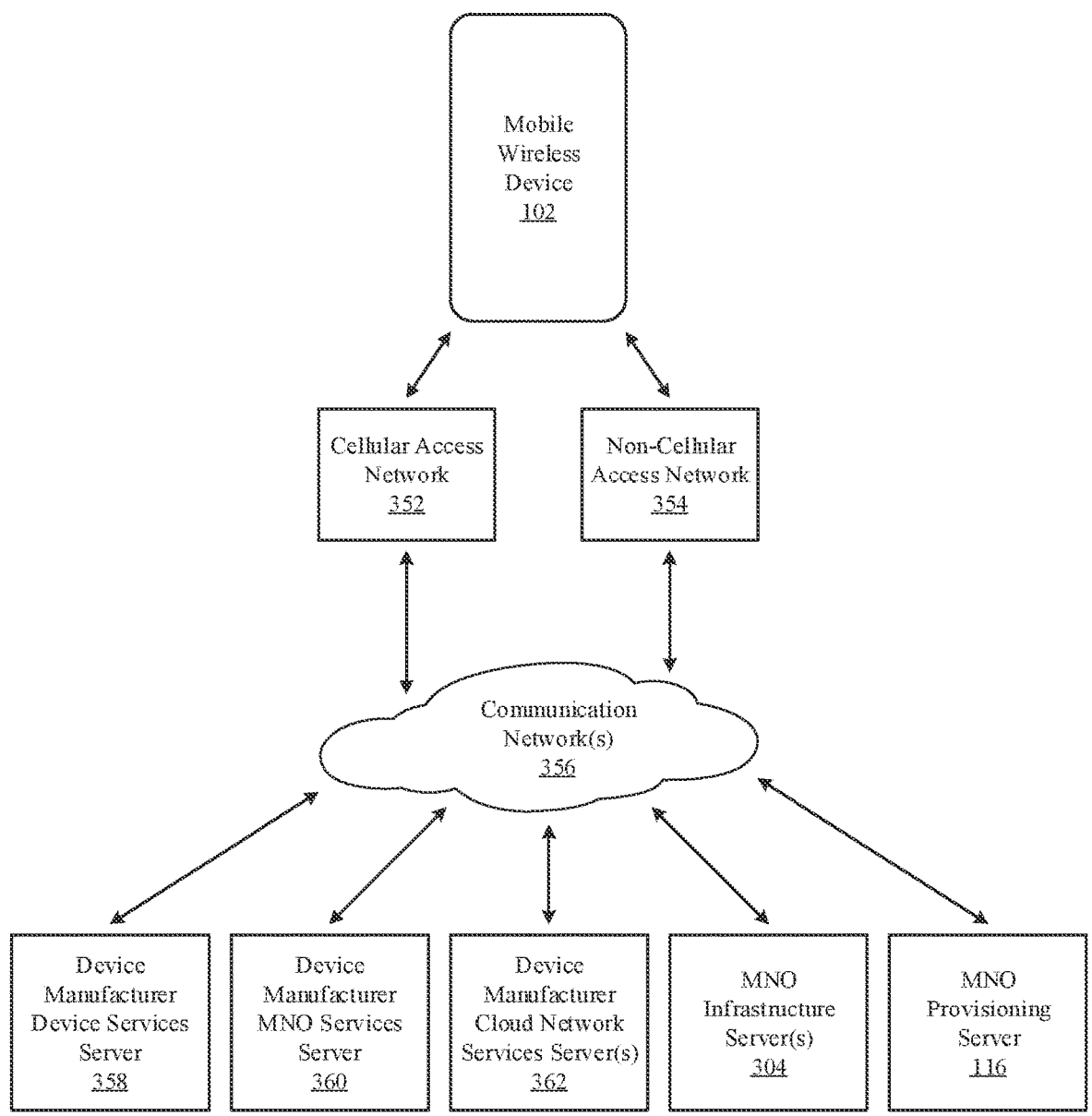
FIG. 3 illustrates a block diagram of exemplary communication paths and network entities for activation of and SIM provisioning to a mobile wireless device, according to some embodiments.

FIG. 3 illustrates a diagram 300 of an exemplary interconnected set of components of a communication system that can be used for device activation and SIM provisioning for a mobile wireless device 102. The mobile wireless device can communicate with various network-based servers via a cellular access network 352 and/or via a non-cellular access network 354 when available. The cellular and/or non-cellular access networks 352, 354 can provide access via communication networks 356 to various network-based servers managed by a device manufacturer or an MNO 114. In some embodiments, the mobile wireless device 102 communicates via a cellular access network 352 when a non-cellular access network 354 is not available. In some embodiments, the mobile wireless device 102 communicates via the cellular access network 352 using a limited functionality SIM (as a physical SIM on a UICC 118 or as an eSIM 208 on an eUICC 108) pre-installed in the mobile wireless device 102 at a time of manufacture when no other active SIM is available on the mobile wireless device 102. An OEM manufacturer of the mobile wireless device 102 can maintain multiple network-based servers to assist with management of the mobile wireless device 102, e.g., a device manufacturer device services server 358, which can provide management for device manufacturer supplied services to the mobile wireless device 102, and a device manufacturer managed MNO services server 360, which can provide a device manufacturer anchor for management of MNO supplied services to the mobile wireless device 102. The OEM manufacturer can also maintain device manufacturer cloud network services servers 362 to provide a cloud network service for storage of device information and data. In some scenarios, multiple mobile wireless devices 102 can be associated with a common user account of a device manufacturer cloud network service realized at least in part by device manufacturer cloud network services servers 362. Authorized access to the user account of the cloud network service can require a secure login with multi-factor authentication. Cellular service subscription information for one or more SIM profiles, such as for eSIMs 208 on the eUICC 108 of the mobile wireless device 102, can be encrypted and securely stored at the cloud network service. In some embodiments, the eSIM subscription information can be retrieved from the cloud network service and used at least in part for recovery of one or more eSIMs 208 previously deleted from the eUICC 108 of the mobile wireless device 102. An MNO 114 can also provide their own set of servers, including various MNO infrastructure servers 304 for managing cellular access, authentication, authorization, subscription, billing, and other associated management functions for cellular wireless services for the mobile wireless device 102, and MNO provisioning servers 116 from which SIM firmware, e.g., eSIMs 208, OTA updates for eSIMs 208 or pSIMs, etc., can be accessed, with appropriate authentication, by the mobile wireless device 102.

Figure 4B:
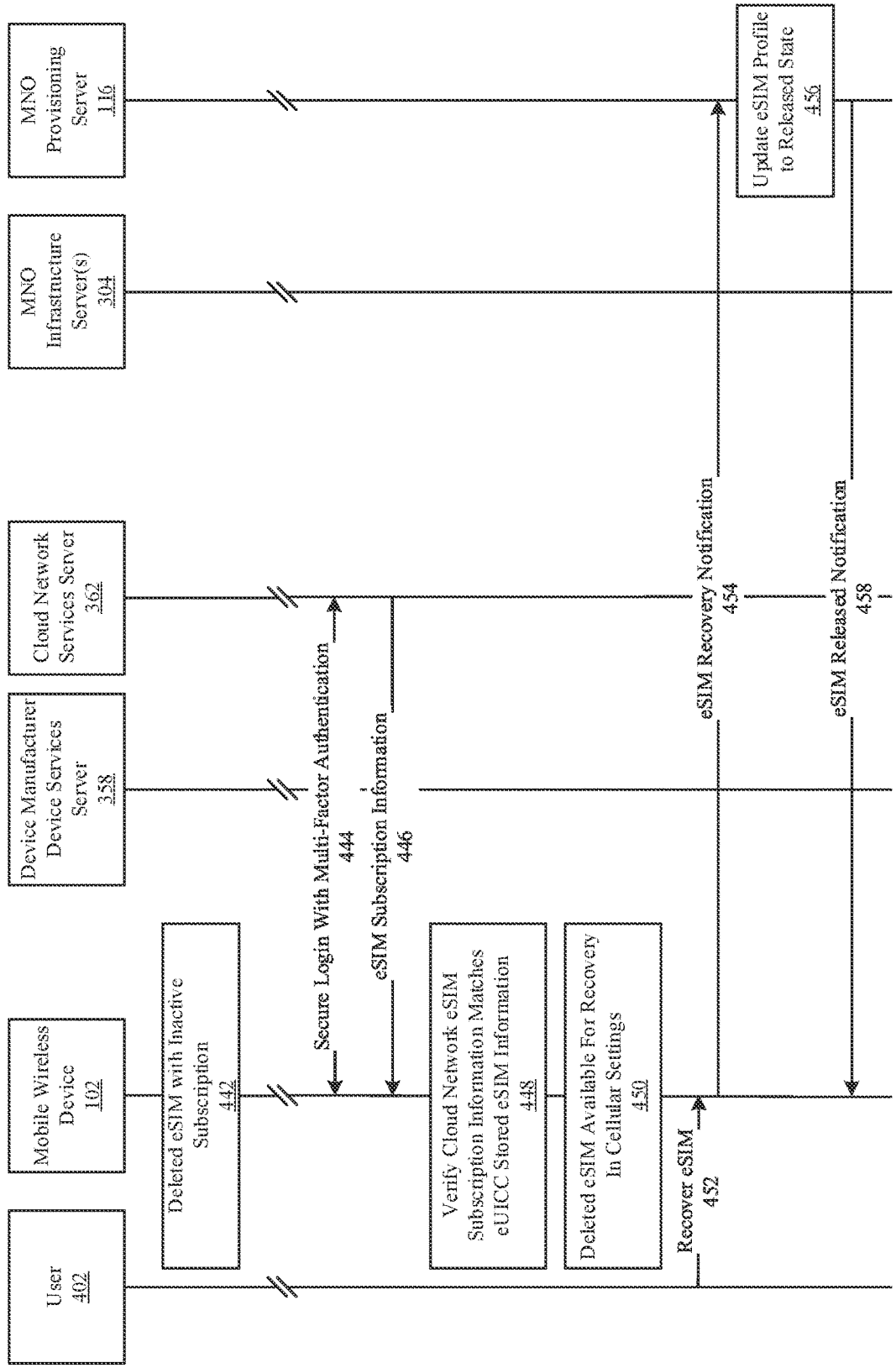
Figure 4C:
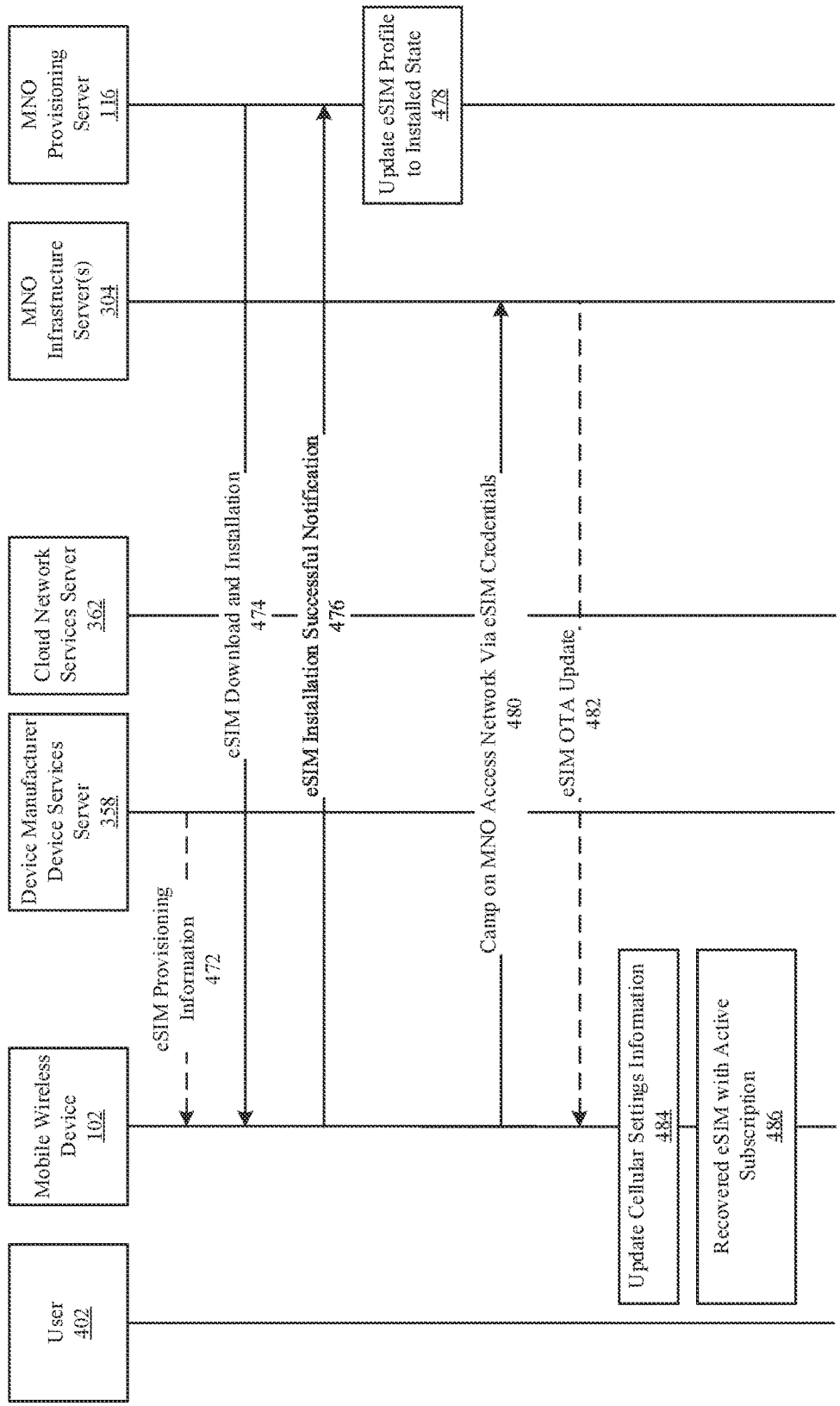

FIGS. 4A, 4B, and 4C illustrate diagrams 400, 440, 470 of an exemplary flow of messages and actions to recover an eSIM 208 to an eUICC 108 of a mobile wireless device 102 with assistance from a device manufacturer cloud network services server 362. At 410, the mobile wireless device 102 downloads the eSIM 208 from an MNO provisioning server 116 and installs the eSIM 208 on the eUICC 108 of the mobile wireless device 102. The mobile wireless device 102 can establish connections with a cellular access network of the MNO 114 using credentials of the eSIM 208 after activation of the eSIM 208 is completed by the MNO provisioning server 116 communicating with one or more back-end MNO infrastructure servers 304. At 412, the mobile wireless device 102 has installed on the eUICC 108 the eSIM 208 with an active subscription for cellular wireless service provided by an MNO 114 associated with the eSIM 208. At a subsequent time, at 414, a user 402 of the mobile wireless device 102 enters, e.g., via a settings user interface of the mobile wireless device 102, a command to delete the eSIM 208. At 416, the mobile wireless device 102 performs a secure login with multi-factor authentication procedure with a device manufacturer cloud network services server 362 (if not already logged in). The secure login is to a user account associated with the mobile wireless device 102. At 418, the mobile wireless device 102 uploads to the cloud network services server 362 eSIM subscription information for the eSIM 208 (which can be included in information for one or more eSIMs 208 on the eUICC 108 of the mobile wireless device 102). In some embodiments, the eSIM subscription information uploaded to the cloud network services server 362 includes a unique identifier for the eSIM 208, e.g., an integrated circuit card identifier (ICCID) value, a network address (e.g., a universal resource locator, fully qualified domain name, or Internet address) for the MNO provisioning server 116 associated with the eSIM 208, and a unique identifier for the eUICC 108 of the mobile wireless device 102, e.g., an eUICC identifier (EID) value. In some embodiments, the eSIM subscription information is encrypted for secure communication to and storage at the cloud network services server 362. At 420, the mobile wireless device 102 stores at least a portion of the eSIM information on a secure memory of the eUICC 108. Representative eSIM information stored locally on the eUICC 108 memory can include the ICCID value associated with the eSIM 208 and the MNO provisioning server 116 network address. At 422, the cloud network services server 362 updates records maintained for the mobile wireless device 102 based on the eSIM subscription information uploaded at 418.

At 424, the mobile wireless device 102 performs an eSIM deletion procedure to delete the eSIM 208 from the eUICC 108 of the mobile wireless device 102. After deletion of the eSIM 208, in some embodiments, at 426, the mobile wireless device 102 establishes a secure connection to communicate with the MNO provisioning server 116. In some embodiments, the mobile wireless device 102 communicates with the MNO provisioning server 116 via a non-cellular wireless connection, such as a WLAN or Wi-Fi connection, after deletion of the eSIM 208. In some embodiments, the mobile wireless device 102 communicates with the MNO provisioning server 116, after deletion of the eSIM 208, via a cellular wireless connection using a different SIM profile (eSIM 208 or physical SIM) available to the mobile wireless device 102. In some embodiments, when neither a non-cellular wireless connection or an alternate cellular wireless connection using a fully functional eSIM/pSIM can be established, the mobile wireless device 102 communicates with the MNO provisioning server 116, after deletion of the eSIM 208, using a connection established with a limited functionality SIM resident in the mobile wireless device 102 (e.g., on the eUICC 108 or on a UICC 118 of the mobile wireless device 102). At 428, the mobile wireless device sends a notification message to the MNO provisioning server 116 indicating that the eSIM was deleted from the eUICC 108 of the mobile wireless device 102. At 430, the mobile wireless device 102 can update cellular settings information to reflect the eSIM deletion. At 432, the MNO provisioning server 116 updates a status of the eSIM 208 maintained at the MNO provisioning server 432 from an installed state to a deleted state. At 442, the mobile wireless device 102 includes a deleted eSIM 208 with an inactive cellular wireless subscription for the deleted eSIM 208.

At a subsequent time, at 444, the mobile wireless device 102 can securely login with multi-factor authentication to the cloud network services server 362. The secure login at 444 can be for the same user account as previously performed at 416. At 446, the mobile wireless device 102 can download eSIM subscription information for the mobile wireless device 102 associated with the user account. Logging into a different user account with the mobile wireless device 102 will not provide access to the eSIM subscription information as previously uploaded. Similarly logging into the same user account with a different device will not provide access to the eSIM subscription information for the mobile wireless device 102. Access to the previously uploaded eSIM subscription information can be restricted to require a secure login with multi-factor authentication to the same user account as used when uploading the eSIM subscription information. At 448, the mobile wireless device 102 compares the eSIM subscription information downloaded from the cloud network services server 362 to corresponding eSIM subscription information obtained from secure memory storage of the eUICC 108. The eSIM subscription information from the remote (cloud network services) storage can match to the local (eUICC 108) storage for one or more eSIMs 208. At 450, the mobile wireless device 102 can allow display of one or more previously deleted eSIMs 208 as available for recovery, e.g., via a cellular settings user interface of the mobile wireless device 102. At 452, the user 402 can provide an input command to recover at least one previously deleted eSIM 208. (For simplicity the remainder of the discussion regards recovering a single eSIM 208; however, extensions for more than one eSIM 208 from a common MNO 114, or for distinct eSIMs 208 from different MNOs 114 can also be considered. When multiple MNOs 114 are involved in eSIM 208 recovery, communication to each associated MNO provisioning server 116 can occur separately). At 454, the mobile wireless device 102 sends a notification message to the MNO provisioning server 116 associated with the eSIM 208 to recover the eSIM 208 to the eUICC 108 of the mobile wireless device 102. In some embodiments, the notification message is an ES9+ recovery notification message. In some embodiments, the notification message includes the ICCID value of the eSIM 208 to be recovered and an EID value for the eUICC 108 to which the eSIM 208 is to be recovered. In some embodiments, the notification message includes multiple ICCID values for multiple eSIMs 208 to be recovered and the eEID value of the eUICC 108. At 456, the MNO provisioning server 116, with proper authentication of the mobile wireless device 102 to allow eSIM recovery, updates the status of the eSIM 208 maintained by the MNO provisioning server 116 from the deleted state to a released state. Proper authentication of the mobile wireless device 102 can be based on a challenge response exchange and/or using digital certificates for verification of the authenticity of messages. In some embodiments, communication between the mobile wireless device 102 and the MNO provisioning server 116 is protected using digital certificates, cryptographic keys, and/or block-chain procedures. At 458, the MNO provisioning server 116 sends a response message to the mobile wireless device 102 indicating that the previously deleted eSIM 208 is released for download to and installation on the eUICC 108 of the mobile wireless device 102. The response message notifying release of the eSIM 208 can include a network address of the MNO provisioning server 116 from which to download the eSIM 208, e.g., a URL or FQDN or numeric network address value. In some embodiments, the message notifying release of the eSIM 208 can include a network address of a device manufacturer device services server 358 from which to obtain information for downloading the eSIM 208. In the latter case, at 472, the mobile wireless device 102 obtains eSIM provisioning information, such as a network address of the appropriate MNO provisioning server 116, from the device manufacturer device services server 358.

At 474, the mobile wireless device 102 downloads the eSIM 208 from the MNO provisioning server 116 and re-installs the eSIM 208 on the eUICC 108 of the mobile wireless device 102. At 476, the mobile wireless device 102 sends a notification message to the MNO provisioning server 116 indicating successful installation of the eSIM 208 on the eUICC 108 of the mobile wireless device 102. At 478, the MNO provisioning server 116 updates the status of the eSIM 208 maintained by the MNO provisioning server 116 from the released state to the installed state. Subsequently, at 480, the mobile wireless device 102 camps on a cellular wireless access network of the MNO 114 using credentials of the eSIM 208. At 482, in some scenarios, the MNO 114, via one or more MNO infrastructure servers 304, provides an over-the-air (OTA) update of the eSIM 208 on the eUICC 108 of the mobile wireless device 102. At 484, the mobile wireless device 102 can update cellular settings interface information to reflect the active and reinstated eSIM 208 on the eUICC 108 of the mobile wireless device 102. At 486, the mobile wireless device 102 has installed a recovered eSIM 208 with an active subscription available for use by the mobile wireless device to access services of the cellular wireless network of the MNO 114 using credentials of the eSIM 208.

Recovery of the eSIM 208 to the same eUICC 108 of the same mobile wireless device 102 to which the eSIM 208 was originally installed can be accomplished without change to back-end servers of the MNO 114, as the ICCID value of the eSIM 208 recovered to the eUICC 108 can be identical (unchanged) and used by the same subscriber identified by an international mobile subscriber identifier (IMSI) value. The eSIM 208 is restored to the same cellular service subscription as previously used and on the identical eUICC 108 and mobile wireless device 102.

Figure 5A:
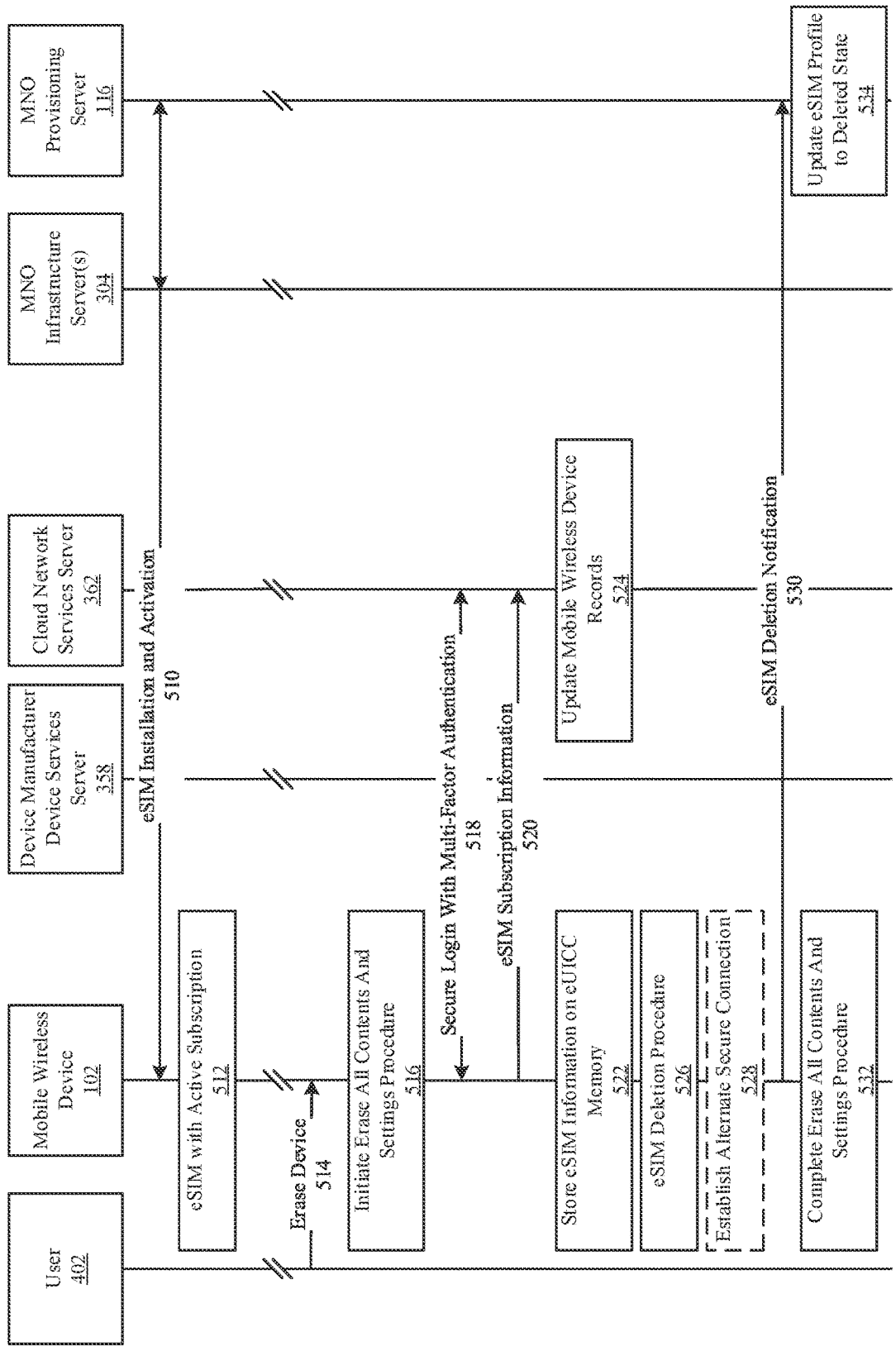
FIGS. 5A, 5B, and 5C illustrate an exemplary for recovery of a deleted eSIM after erasure and restoration of a mobile wireless device with cloud network service assistance, according to some embodiments.
Figure 5B:
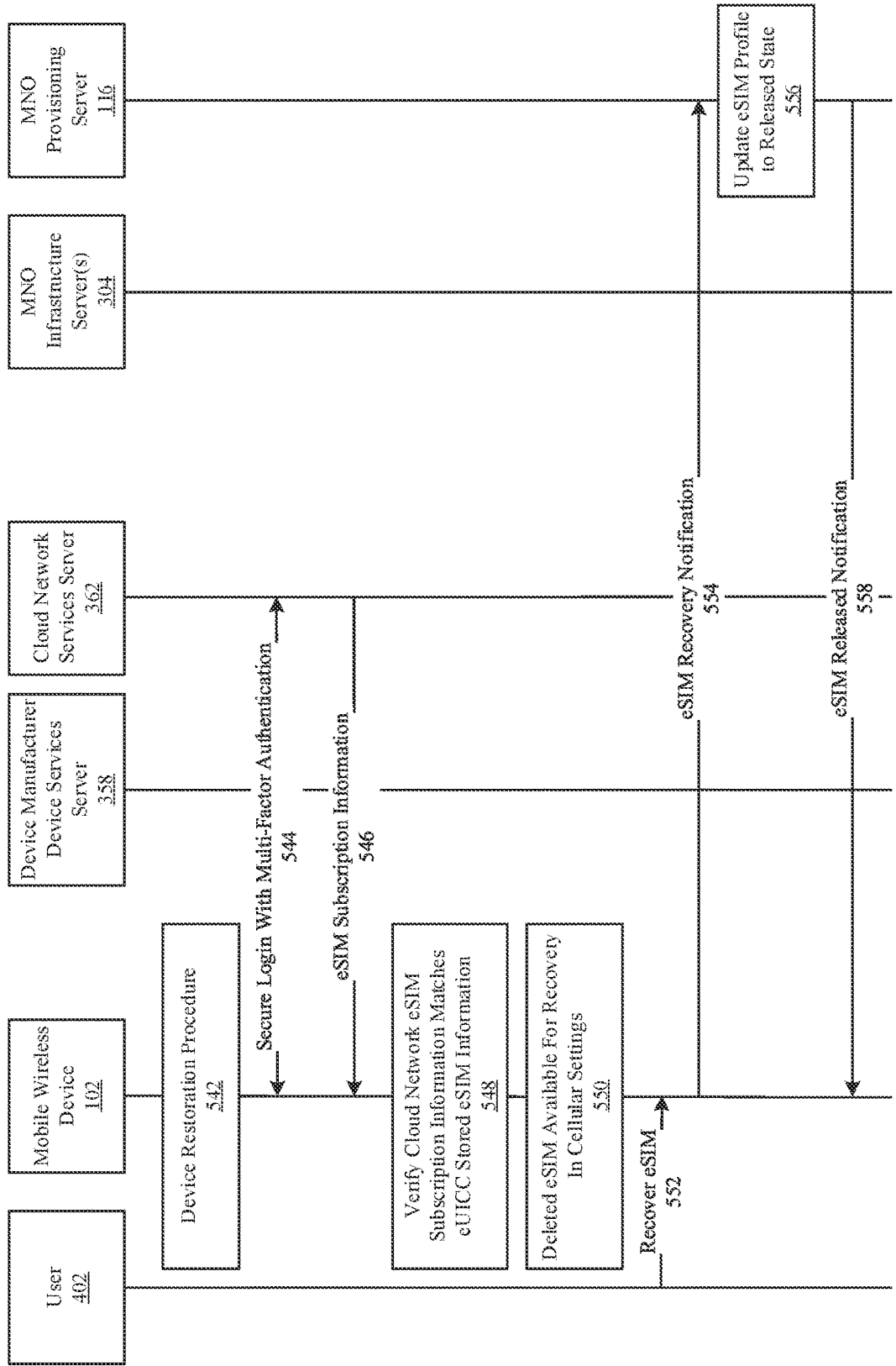
Figure 5C:
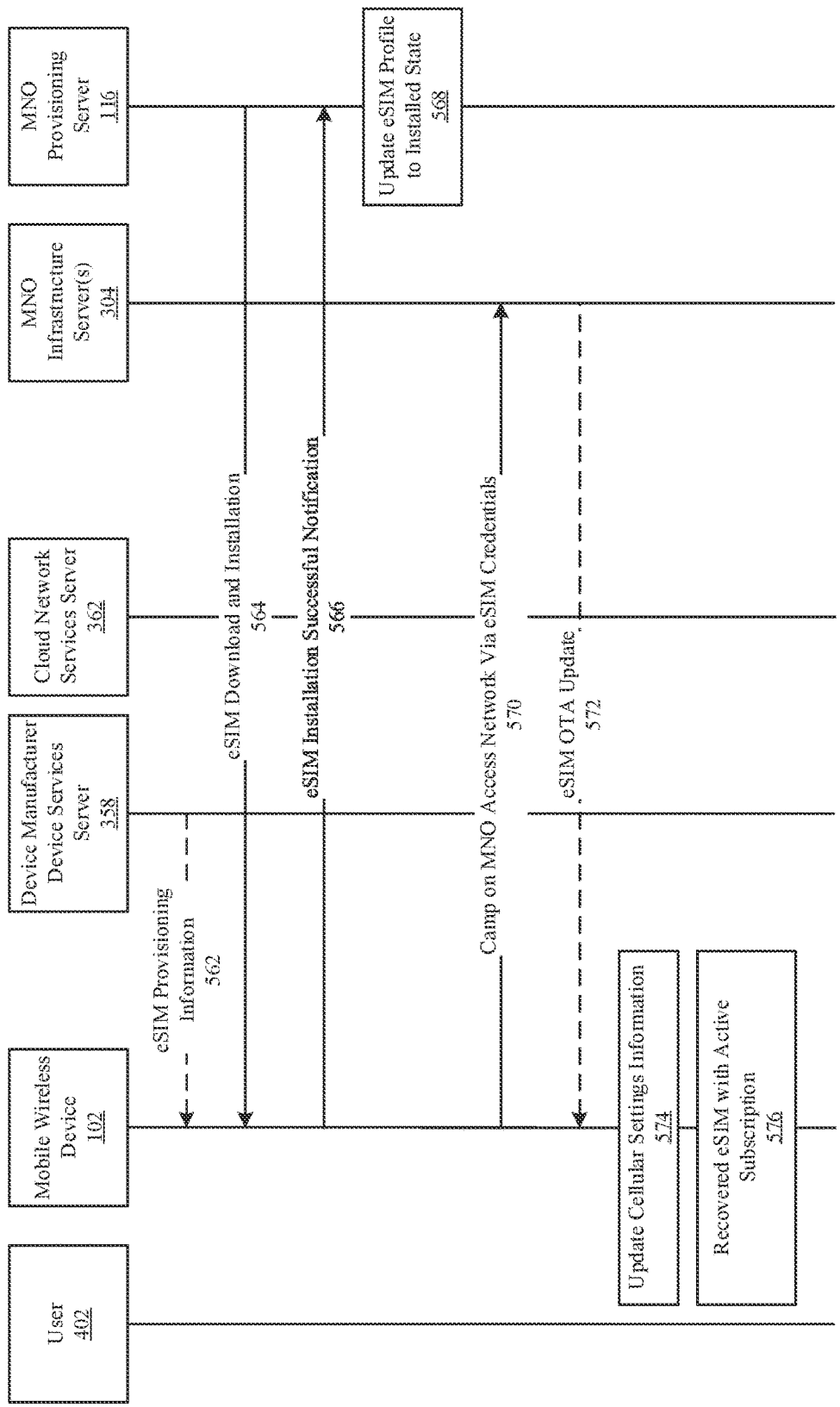

FIGS. 5A, 5B, and 5C illustrate diagrams 500, 540, 570 of an exemplary flow of messages and actions to recover an eSIM 208 to an eUICC 108 of a mobile wireless device 102 after a factory reset or device erasure and restoration procedure. At 510, the mobile wireless device 102 downloads the eSIM 208 from an MNO provisioning server 116 and installs the eSIM 208 on the eUICC 108 of the mobile wireless device 102. The mobile wireless device 102 can establish connections with a cellular access network of the MNO 114 using credentials of the eSIM 208 after activation of the eSIM 208 is completed by the MNO provisioning server 116 communicating with one or more back-end MNO infrastructure servers 304. At 512, the mobile wireless device 102 has installed on the eUICC 108 the eSIM 208 with an active subscription for cellular wireless service provided by an MNO 114 associated with the eSIM 208. At a subsequent time, at 514, a user 402 of the mobile wireless device 102 enters, e.g., via a settings user interface of the mobile wireless device 102, a command to erase all contents and settings of the mobile wireless device 102, e.g., to perform a factory reset procedure. At 516, the mobile wireless device 102 initiates the erase all contents and settings procedure. At 518, the mobile wireless device 102 performs a secure login with multi-factor authentication procedure with a device manufacturer cloud network services server 362 (if not already logged in). The secure login is to a user account associated with the mobile wireless device 102. At 520, the mobile wireless device 102 uploads to the cloud network services server 362 eSIM subscription information for the eSIM 208 (which can be included in information for one or more eSIMs 208 on the eUICC 108 of the mobile wireless device 102). In some embodiments, the eSIM subscription information uploaded to the cloud network services server 362 includes a unique identifier for the eSIM 208, e.g., an integrated circuit card identifier (ICCID) value, a network address (e.g., a universal resource locator, fully qualified domain name, or Internet address) for the MNO provisioning server 116 associated with the eSIM 208, and a unique identifier for the eUICC 108 of the mobile wireless device 102, e.g., an eUICC identifier (EID) value. In some embodiments, the eSIM subscription information is encrypted for secure communication to and storage at the cloud network services server 362. At 522, the mobile wireless device 102 stores at least a portion of the eSIM information on a secure memory of the eUICC 108. Representative eSIM information stored locally on the eUICC 108 memory can include the ICCID value associated with the eSIM 208 and the MNO provisioning server 116 network address. At 524, the cloud network services server 362 updates records maintained for the mobile wireless device 102 based on the eSIM subscription information uploaded at 520.

At 526, the mobile wireless device 102 performs an eSIM deletion procedure (which can be part of the erase all contents and settings procedure) to delete the eSIM 208 from the eUICC 108 of the mobile wireless device 102. After deletion of the eSIM 208, in some embodiments, at 528, the mobile wireless device 102 establishes a secure connection to communicate with the MNO provisioning server 116. In some embodiments, the mobile wireless device 102 communicates with the MNO provisioning server 116 via a non-cellular wireless connection, such as a WLAN or Wi-Fi connection, after deletion of the eSIM 208. In some embodiments, the mobile wireless device 102 communicates with the MNO provisioning server 116, after deletion of the eSIM 208, via a cellular wireless connection using a different SIM profile (eSIM 208 or physical SIM) available to the mobile wireless device 102. In some embodiments, when neither a non-cellular wireless connection or an alternate cellular wireless connection using a fully functional eSIM/pSIM can be established, the mobile wireless device 102 communicates with the MNO provisioning server 116, after deletion of the eSIM 208, using a connection established with a limited functionality SIM resident in the mobile wireless device 102 (e.g., on the eUICC 108 or on a UICC 118 of the mobile wireless device 102). At 530, the mobile wireless device sends a notification message to the MNO provisioning server 116 indicating that the eSIM was deleted from the eUICC 108 of the mobile wireless device 102. At 532, the mobile wireless device 102 completes the erase all contents and settings procedure. At 534, the MNO provisioning server 116 updates a status of the eSIM 208 maintained at the MNO provisioning server 432 from an installed state to a deleted state.

Subsequently, at 542, the mobile wireless device 102 can execute a device restoration procedure, e.g., to restore user specific settings and configuration for the mobile wireless device 102. At 544, the mobile wireless device 102 can securely login with multi-factor authentication to the cloud network services server 362. The secure login at 544 can be for the same user account as previously performed at 518. At 546, the mobile wireless device 102 can download eSIM subscription information for the mobile wireless device 102 associated with the user account. Logging into a different user account with the mobile wireless device 102 will not provide access to the eSIM subscription information as previously uploaded. Similarly logging into the same user account with a different device will not provide access to the eSIM subscription information for the mobile wireless device 102. Access to the previously uploaded eSIM subscription information can be restricted to require a secure login with multi-factor authentication to the same user account as used when uploading the eSIM subscription information. At 548, the mobile wireless device 102 compares the eSIM subscription information downloaded from the cloud network services server 362 to corresponding eSIM subscription information obtained from secure memory storage of the eUICC 108. The eSIM subscription information from the remote (cloud network services) storage can match to the local (eUICC 108) storage for one or more eSIMs 208. At 550, the mobile wireless device 102 can allow display of one or more previously deleted eSIMs 208 as available for recovery, e.g., via a cellular settings user interface of the mobile wireless device 102. At 552, the user 402 can provide an input command to recover at least one previously deleted eSIM 208. (For simplicity the remainder of the discussion regards recovering a single eSIM 208; however, extensions for more than one eSIM 208 from a common MNO 114, or for distinct eSIMs 208 from different MNOs 114 can also be considered. When multiple MNOs 114 are involved in eSIM 208 recovery, communication to each associated MNO provisioning server 116 can occur separately). At 554, the mobile wireless device 102 sends a notification message to the MNO provisioning server 116 associated with the eSIM 208 to recover the eSIM 208 to the eUICC 108 of the mobile wireless device 102. In some embodiments, the notification message is an ES9+ recovery notification message. In some embodiments, the notification message includes the ICCID value of the eSIM 208 to be recovered and an EID value for the eUICC 108 to which the eSIM 208 is to be recovered. In some embodiments, the notification message includes multiple ICCID values for multiple eSIMs 208 to be recovered and the eEID value of the eUICC 108. At 556, the MNO provisioning server 116, with proper authentication of the mobile wireless device 102 to allow eSIM recovery, updates the status of the eSIM 208 maintained by the MNO provisioning server 116 from the deleted state to a released state. Proper authentication of the mobile wireless device 102 can be based on a challenge response exchange and/or using digital certificates for verification of the authenticity of messages. In some embodiments, communication between the mobile wireless device 102 and the MNO provisioning server 116 is protected using digital certificates, cryptographic keys, and/or block-chain procedures. At 558, the MNO provisioning server 116 sends a response message to the mobile wireless device 102 indicating that the previously deleted eSIM 208 is released for download to and installation on the eUICC 108 of the mobile wireless device 102. The response message notifying release of the eSIM 208 can include a network address of the MNO provisioning server 116 from which to download the eSIM 208, e.g., a URL or FQDN or numeric network address value. In some embodiments, the message notifying release of the eSIM 208 can include a network address of a device manufacturer device services server 358 from which to obtain information for downloading the eSIM 208. In the latter case, at 562, the mobile wireless device 102 obtains eSIM provisioning information, such as a network address of the appropriate MNO provisioning server 116, from the device manufacturer device services server 358.

At 564, the mobile wireless device 102 downloads the eSIM 208 from the MNO provisioning server 116 and re-installs the eSIM 208 on the eUICC 108 of the mobile wireless device 102. At 566, the mobile wireless device 102 sends a notification message to the MNO provisioning server 116 indicating successful installation of the eSIM 208 on the eUICC 108 of the mobile wireless device 102. At 568, the MNO provisioning server 116 updates the status of the eSIM 208 maintained by the MNO provisioning server 116 from the released state to the installed state. Subsequently, at 570, the mobile wireless device 102 camps on a cellular wireless access network of the MNO 114 using credentials of the eSIM 208. At 572, in some scenarios, the MNO 114, via one or more MNO infrastructure servers 304, provides an over-the-air (OTA) update of the eSIM 208 on the eUICC 108 of the mobile wireless device 102. At 574, the mobile wireless device 102 can update cellular settings interface information to reflect the active and reinstated eSIM 208 on the eUICC 108 of the mobile wireless device 102. At 576, the mobile wireless device 102 has installed a recovered eSIM 208 with an active subscription available for use by the mobile wireless device to access services of the cellular wireless network of the MNO 114 using credentials of the eSIM 208.

As with the previously described eSIM 208 deletion and recovery procedure of FIGS. 4A, 4B, and 4C, recovery of one or more eSIMs 208 to the same eUICC 108 of the same mobile wireless device 102 to which the eSIMs 208 were originally installed as part of a device restoration process after a device erasure can be accomplished without change to back-end servers of one or more associated MNOs 114, as the ICCID values of the eSIMs 208 recovered to the eUICC 108 can be identical (unchanged) and used by the same subscriber identified by one or more IMSI values with respective MNOs 114. The eSIMs 208 are restored to the same cellular service subscriptions as previously used and on the identical eUICC 108 and mobile wireless device 102.

Figure 6A:
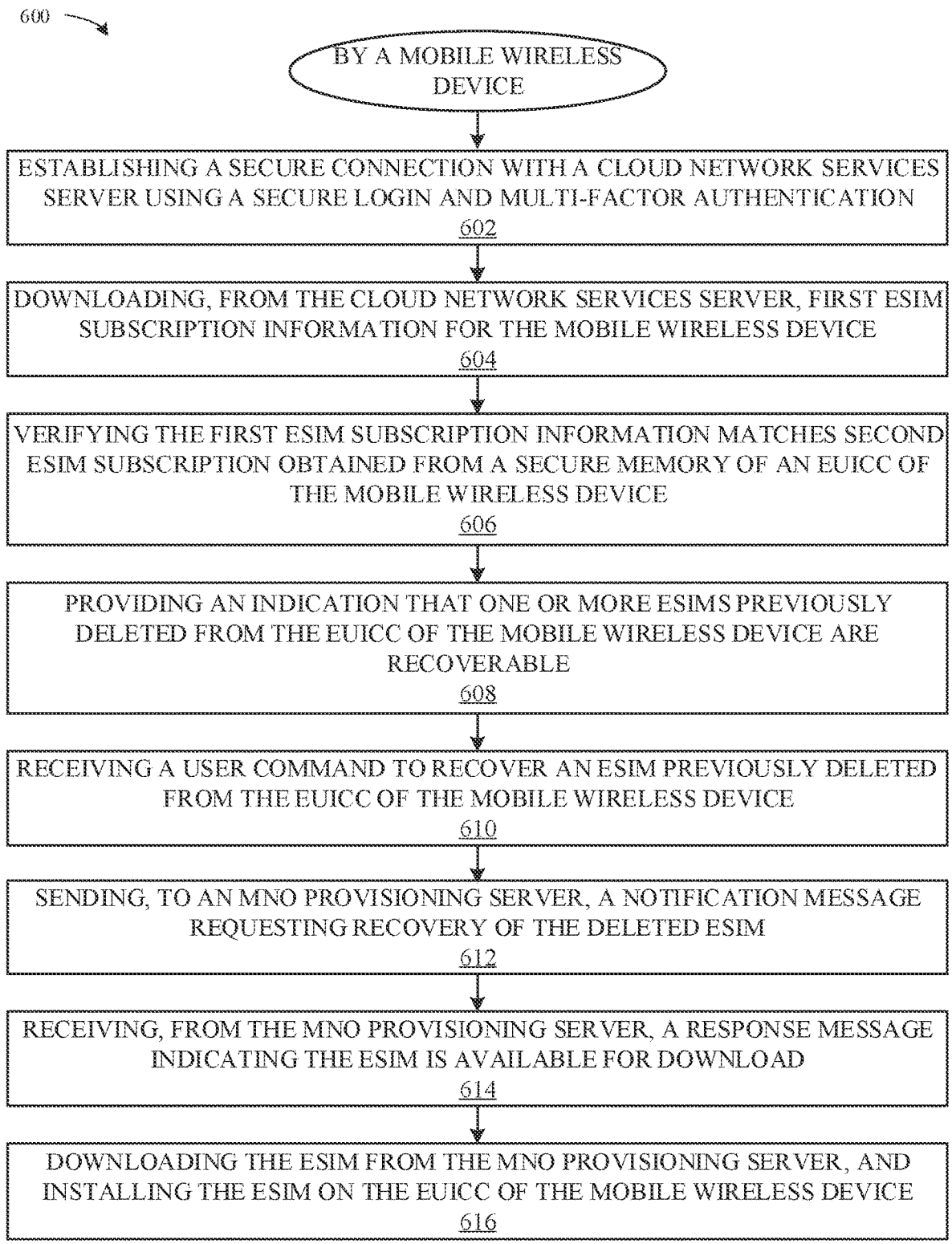
FIG. 6A illustrates a flowchart of an exemplary method for deleted eSIM recovery performed by a mobile wireless device, according to some embodiments.

FIG. 6A illustrates a flowchart 600 of an exemplary method for recovery of an eSIM 208 to an eUICC 108 of a mobile wireless device 102, where the method is performed by the mobile wireless device 102. At 602, the mobile wireless device 102 establishes a secure connection with a cloud network services server 362 using a secure login procedure with multi-factor authentication. The login is to a user account with which the mobile wireless device 102 was previously associated. At 604, the mobile wireless device 102 downloads, from the cloud network services server 362, first eSIM subscription information for the mobile wireless device 102. The first eSIM subscription information can include identifiers for one or more eSIMs 208 presently and/or previously installed on the eUICC 108 of the mobile wireless device 102. In some embodiments, the first subscription information includes an eUICC identifier (EID) value for the eUICC 108 of the mobile wireless device 102. In some embodiments, the first eSIM subscription information includes for each eSIM 208 of one or more eSIMs 208 previously deleted from the eUICC 108 of the mobile wireless device 102, an ICCID value for the eSIM 208 and a network address for a provisioning server 116 associated with the eSIM 208. In some embodiments, the first subscription information includes information for one or more presently installed eSIMs 208 and one or more previously installed eSIMs 208. At 606, the mobile wireless device 102 compares at least a portion of the first eSIM information to second eSIM information obtained from a secure memory of the eUICC 108 of the mobile wireless device 102. The second eSIM information can have been stored in the secure memory of the eUICC 108 before deletion of one or more eSIMs from the eUICC 108 occurred. In some embodiments, the second eSIM subscription information includes for each eSIM 208 of one or more eSIMs 208 previously deleted from the eUICC 108 of the mobile wireless device 102, an associated ICCID value for the eSIM 208 a network address for a provisioning server 116 associated with the eSIM 208. The mobile wireless device 102 can verify, at 606, that the first eSIM subscription information for a previously deleted eSIM 208 (or set of eSIMs 208) matches the second eSIM subscription information for the previously deleted eSIM(s) 208. When the first and eSIM subscription information matches the second eSIM subscription information for one or more previously deleted eSIMs 208 sought to be recovered, the mobile wireless device 102, at 608 provides an indication that one or more previously deleted eSIMs 208 are recoverable, e.g., via a cellular settings user interface of the mobile wireless device 102. When the first eSIM subscription information does not match the second eSIM subscription information for at least one eSIM 208, the mobile wireless device 102 can suppress indications that the at least one eSIM is recoverable. In some embodiments, some eSIMs 208 can be recoverable, while other eSIMs can be unrecoverable. At 610, the mobile wireless device 102 receives a user command to recover an eSIM 208 that was previously deleted from the eUICC 108 of the mobile wireless device 102. At 612, the mobile wireless device 102, responsive to the user command to recover the eSIM 208, sends, to an MNO provisioning server 116 associated with the eSIM, a notification message requesting recovery of the deleted eSIM 208. In some embodiments, the notification message requesting recovery of the deleted eSIM 208 includes an ICCID value for the eSIM 208 and an EID value for the eUICC 108 of the mobile wireless device 102. At 614, the mobile wireless device 102 receives, from the MNO provisioning server 116, a response message indicating that the eSIM requested is available for download to the eUICC 108 of the mobile wireless device 102. In some embodiments, the response message indicating the eSIM 208 is available for download includes the ICCID value of the eSIM 208 and an EID value of the eUICC 108 of the mobile wireless device 102. In some embodiments, the response message includes a network address of the MNO provisioning server 116 from which to download the eSIM 208. In some embodiments, response message includes a network address of a device manufacturer devices services server 358 from which to obtain a network address for the MNO provisioning server 116 from which to download the eSIM 208. At 616, the mobile wireless device 102 downloads the eSIM 208 from the MNO provisioning server 116 and installs the eSIM 208 on the eUICC 108 of the mobile wireless device 102. In some embodiments, before establishing the secure connection with the cloud network services server 362 for downloading the first eSIM subscription information, the mobile wireless device 102 receives a second user command to delete the eSIM 208 from the eUICC 108 of the mobile wireless device 102. In some embodiments, the mobile wireless device 102, establishes a second secure connection with the cloud network services server 362 using a secure login procedure with multi-factor authentication and uploads, to the cloud network services server 362 the first eSIM subscription information for the eSIM 208 requested to be deleted. In some embodiments, the mobile wireless device 102 also stores the second eSIM subscription information for the eSIM requested to be deleted in the secure memory of the eUICC 108 of the mobile wireless device 102. In some embodiments, the mobile wireless device 102 deletes the eSIM 208 from the eUICC 108 of the mobile wireless device 102 and sends, to the MNO provisioning server 116 associated with the eSIM 208, an eSIM deletion notification message. In some embodiments, the mobile wireless device 102 deletes the eSIM 208 as part of a factory reset or erase all contents and settings procedure for the mobile wireless device 102 and subsequently recovers the deleted eSIM 208.

Figure 6B:
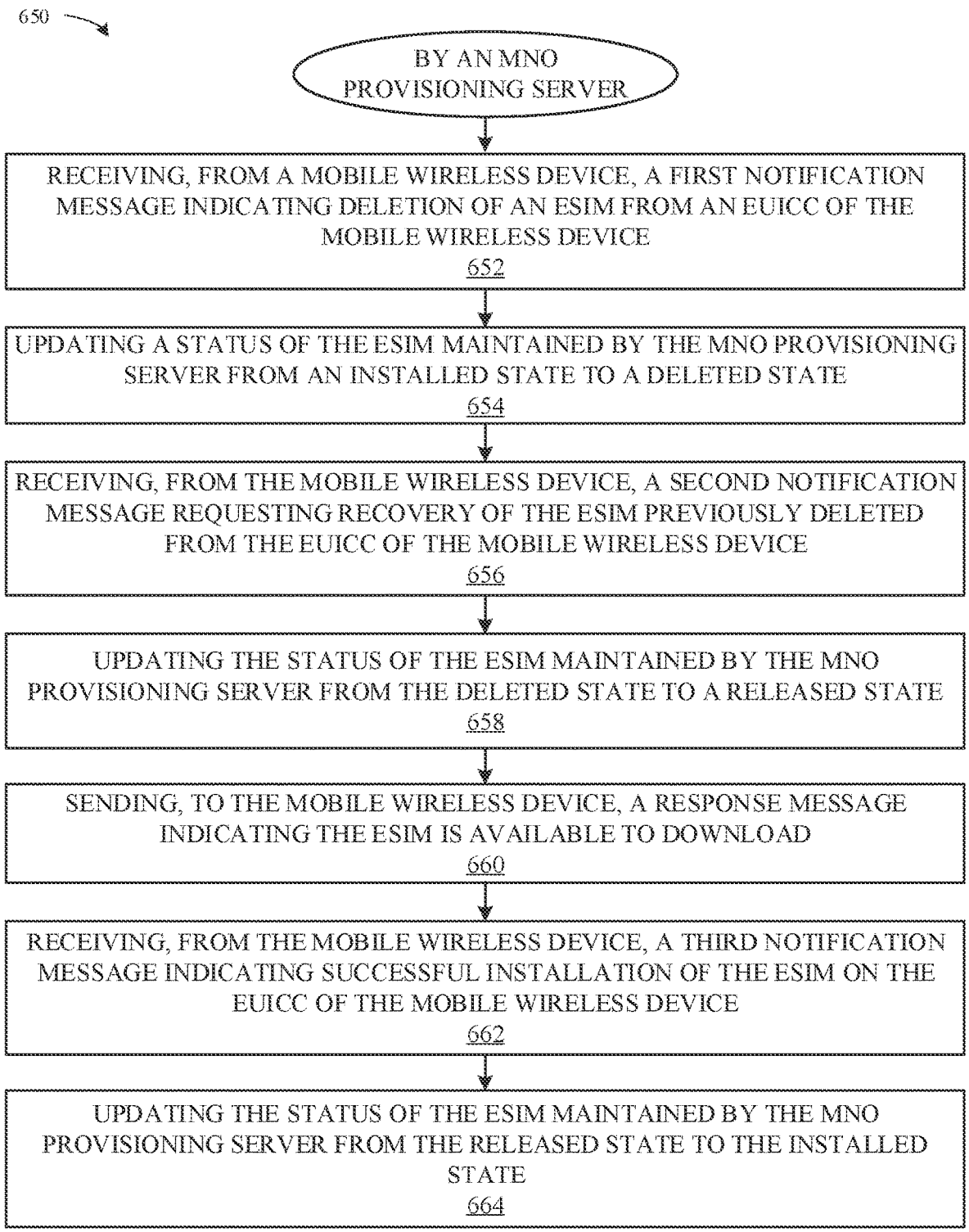
FIG. 6B illustrates a flowchart of an exemplary method for deleted eSIM recovery performed by an MNO provisioning server, according to some embodiments.

FIG. 6B illustrates a flowchart 650 of an exemplary method for recovery of an eSIM 208 to an eUICC 108 of a mobile wireless device 102, where the method is performed by an MNO provisioning server 116. At 652, the MNO provisioning server 116 receives, from a mobile wireless device 102, a first notification message indicating deletion of an eSIM 208 from an eUICC 108 of the mobile wireless device 102. In some embodiments, the first notification message includes an ICCID value of the eSIM 208 and an EID value of the eUICC 108. At 654, the MNO provisioning server 116 updates a status of the eSIM 208 maintained by the MNO provisioning server 116 from an installed state to a deleted state. At 656, the MNO provisioning server 116 receives, from the mobile wireless device 102, a second notification message requesting recovery of the eSIM 208 previously deleted from the eUICC 108 of the mobile wireless device 102. In some embodiments, the second notification message includes the ICCID value of the eSIM 208 and the EID value of the eUICC 108. At 658, the MNO provisioning server 116 updates the status of the eSIM 208 maintained by the MNO provisioning server 116 from the deleted stated to a released state. At 660, the MNO provisioning server 116 sends to the mobile wireless device 102 a response message indicating that the eSIM 208 is available to download. In some embodiments, the response message includes the ICCID value of the eSIM 208 and the EID value of the eUICC 108. In some embodiments, the response message includes a network address of an MNO provisioning server 116 from which to download the eSIM 208. In some embodiments, the response message includes a network address of a device manufacturer device services server 358 from which to obtain a network address of an MNO provisioning server 116 from which to download the eSIM 208. At 662, the MNO provisioning server 116 receives, from the mobile wireless device 102, a third notification message indicating successful installation of the eSIM on the eUICC 108 of the mobile wireless device 102. At 664, the MNO provisioning server 116 updates the status of the eSIM 208 maintained by the MNO provisioning server 116 from the released state to the installed state.

Figure 7:
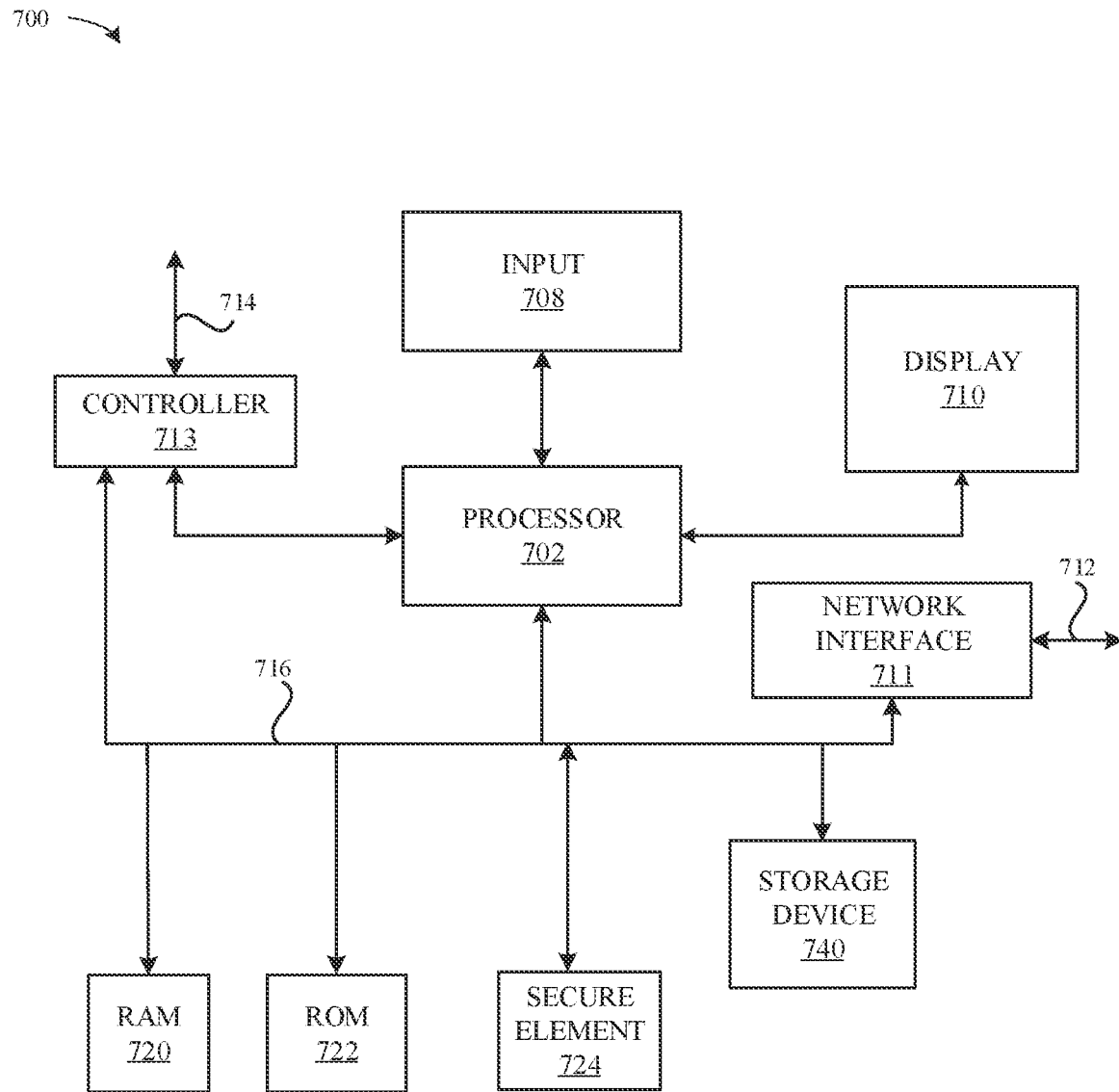
FIG. 7 illustrates a block diagram of exemplary elements of a mobile wireless device, according to some embodiments.

FIG. 7 illustrates a detailed view of a representative computing device 700 that can be used to implement various methods described herein, according to some embodiments. In particular, the detailed view illustrates various components that can be included in the mobile wireless device 102. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor 702 to display information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that communicatively couples to a data link 712. In the case of a wireless connection, the network/bus interface 711 can include a wireless transceiver.

The computing device 700 also includes a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700. The computing device 700 can further include a secure element (SE) 724, which can represent secure storage for cellular wireless system access by the mobile wireless device 102, such as an eUICC 108 on which to store one or more eSIMs 208 and/or a UICC 118 on which to store a physical SIM (pSIM).

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for recovering electronic Subscriber Identity Modules (eSIMs) for access to services of a mobile network operator (MNO) by a mobile wireless device, the method comprising:
by the mobile wireless device:
establishing a secure connection with a cloud network services server using a secure login procedure and multi-factor authentication;
downloading, from the cloud network services server, first eSIM subscription information for the mobile wireless device;
determining whether the first eSIM subscription information matches second eSIM subscription information obtained from a secure memory of an embedded universal integrated circuit card (eUICC) of the mobile wireless device; and
when the first eSIM subscription information matches the second eSIM subscription information for one or more eSIMs previously deleted from the eUICC of the mobile wireless device:
indicating that the one or more eSIMs previously deleted from the eUICC of the mobile wireless device are recoverable;
receiving a user command to recover an eSIM associated with the MNO and previously deleted from the eUICC of the mobile wireless device;
sending, to an MNO provisioning server, a notification message requesting recovery of the eSIM previously deleted from the eUICC of the mobile wireless device;
receiving, from the MNO provisioning server, a response message indicating the eSIM is available for download;

downloading the eSIM from the MNO provisioning server; and installing the eSIM on the eUICC of the mobile wireless device.

2. The method of claim 1, wherein the first eSIM subscription information comprises:
an eUICC identifier (EID) value for the eUICC of the mobile wireless device; and
for each eSIM of the one or more eSIMs previously deleted from the eUICC of the mobile wireless device:
an integrated circuit card identifier (ICCID) value for the eSIM; and
a network address for a provisioning server associated with the eSIM.

3. The method of claim 2, wherein the second eSIM subscription information comprises for each eSIM of the one or more eSIMs previously deleted from the eUICC of the mobile wireless device:
the ICCID value for the eSIM; and
the network address for the provisioning server associated with the eSIM.

4. The method of claim 1, further comprising:
when the first eSIM subscription information does not match the second eSIM subscription information for at least one eSIM, suppressing indication that the at least one eSIM is recoverable.

5. The method of claim 1, further comprising:
by the mobile wireless device, prior to establishing the secure connection with the cloud network services server for downloading the first eSIM subscription information:
receiving a second user command to delete the eSIM from the eUICC of the mobile wireless device;
establishing a second secure connection with the cloud network services server using the secure login procedure and multi-factor authentication; and
uploading, to the cloud network services server, the first eSIM subscription information for the eSIM to be deleted.

6. The method of claim 5, further comprising:
by the mobile wireless device:
storing the second eSIM subscription information for the eSIM to be deleted in the secure memory of the eUICC of the mobile wireless device.

7. The method of claim 6, further comprising:
by the mobile wireless device:
deleting the eSIM from the eUICC of the mobile wireless device; and
sending, to the MNO provisioning server associated with the eSIM, an eSIM deletion notification message.

8. The method of claim 1, wherein the notification message requesting recovery of the eSIM previously deleted from the eUICC of the mobile wireless device comprises:
an integrated circuit card identifier (ICCID) value for the eSIM; and
an eUICC identifier (EID) value of the eUICC of the mobile wireless device.

9. The method of claim 8, wherein the response message indicating the eSIM is available for download comprises:
the ICCID value for the eSIM;
the EID value of the eUICC of the mobile wireless device; and
a network address of the MNO provisioning server from which to download the eSIM.

10. The method of claim 8, wherein the response message indicating the eSIM is available for download comprises:
the ICCID value for the eSIM;
the EID value of the eUICC of the mobile wireless device; and
a network address of a device manufacturer devices services server from which to obtain a network address for the MNO provisioning server from which to download the eSIM.

11. The method of claim 1, further comprising:
by the mobile wireless device, prior to establishing the secure connection with the cloud network services server for downloading the first eSIM subscription information:
receiving a second user command to perform an erase all contents and settings procedure for the mobile wireless device;
establishing a second secure connection with the cloud network services server using the secure login procedure and multi-factor authentication;
uploading, to the cloud network services server, first eSIM subscription information for the eSIM to be deleted;
storing second eSIM subscription information for the eSIM to be deleted in the secure memory of the eUICC of the mobile wireless device;
deleting the eSIM from the eUICC of the mobile wireless device; and
sending, to the MNO provisioning server associated with the eSIM, an eSIM deletion notification message.

12. A method for recovering an electronic Subscriber Identity Module (eSIM) to provide access to services of a mobile network operator (MNO) by a mobile wireless device, the method comprising:
by an MNO provisioning server of the MNO:
receiving, from the mobile wireless device, a first notification message indicating deletion of an eSIM from an eUICC of the mobile wireless device;
updating a status of the eSIM maintained by the MNO provisioning server from an installed state to a deleted state;
receiving, from the mobile wireless device, a second notification message requesting recovery of the eSIM previously deleted from the eUICC of the mobile wireless device;
updating the status of the eSIM maintained by the MNO provisioning server from the deleted state to a released state;
sending, to the mobile wireless device, a response message indicating the eSIM is available to download;
downloading the eSIM to the mobile wireless device;
receiving, from the mobile wireless device, a third notification message indicating successful installation of the eSIM on the eUICC of the mobile wireless device; and
updating the status of the eSIM maintained by the MNO provisioning server from the released state to the installed state.

13. The method of claim 12, wherein the second notification message requesting recovery of the eSIM previously deleted from the eUICC of the mobile wireless device comprises:
an integrated circuit card identifier (ICCID) value for the eSIM; and
an eUICC identifier (EID) value of the eUICC of the mobile wireless device.

14. The method of claim 12, wherein the response message indicating the eSIM is available for download comprises:
the ICCID value for the eSIM;
the EID value of the eUICC of the mobile wireless device; and
a network address of the MNO provisioning server from which to download the eSIM.

15. The method of claim 12, wherein the response message indicating the eSIM is available for download comprises:
the ICCID value for the eSIM;
the EID value of the eUICC of the mobile wireless device; and
a network address of a device manufacturer devices services server from which to obtain a network address for the MNO provisioning server from which to download the eSIM.

16. A mobile wireless device comprising:
wireless circuitry comprising one or more antennas; and
one or more processors communicatively coupled to the wireless circuitry and to a memory storing instructions that, when executed by the one or more processors, cause the mobile wireless device to recover an electronic Subscriber Identity Module (eSIM) for access to services of a mobile network operator (MNO) by at least:
establishing a secure connection with a cloud network services server using a secure login procedure and multi-factor authentication;
downloading, from the cloud network services server, first eSIM subscription information for the mobile wireless device;
verifying the first eSIM subscription information matches second eSIM subscription information obtained from a secure memory of an embedded universal integrated circuit card (eUICC) of the mobile wireless device; and
providing, via a display of the mobile wireless device, an indication that an eSIM previously deleted from the eUICC of the mobile wireless device and associated with the MNO is recoverable;
receiving a user command to recover the eSIM associated with the MNO and previously deleted from the eUICC of the mobile wireless device;
sending, to an MNO provisioning server associated with the eSIM, a notification message requesting recovery of the eSIM previously deleted from the eUICC of the mobile wireless device;
receiving, from the MNO provisioning server, a response message indicating the eSIM is available for download;
downloading the eSIM from the MNO provisioning server; and
installing the eSIM on the eUICC of the mobile wireless device.

17. The mobile wireless device of claim 16, wherein the first eSIM subscription information comprises:
an eUICC identifier (EID) value for the eUICC of the mobile wireless device;
an integrated circuit card identifier (ICCID) value for the eSIM previously deleted from the eUICC of the mobile wireless device; and
a network address for a provisioning server associated with the eSIM.

18. The mobile wireless device of claim 17, wherein the second eSIM subscription information comprises:
the ICCID value for the eSIM; and
the network address for the provisioning server associated with the eSIM.

19. The mobile wireless device of claim 16, wherein the eSIM was deleted from the eUICC of the mobile wireless device responsive to a user command to delete the eSIM.

20. The mobile wireless device of claim 16, wherein the eSIM was deleted from the eUICC of the mobile wireless device responsive to a user commend to erase all contents and settings of the mobile wireless device.

* * * * *